I. L. DAWSON.
SYSTEM AND APPARATUS FOR DISPOSING OF PLANT STALKS.
APPLICATION FILED SEPT. 28, 1914.
1,162,985.
Patented Dec. 7, 1915.
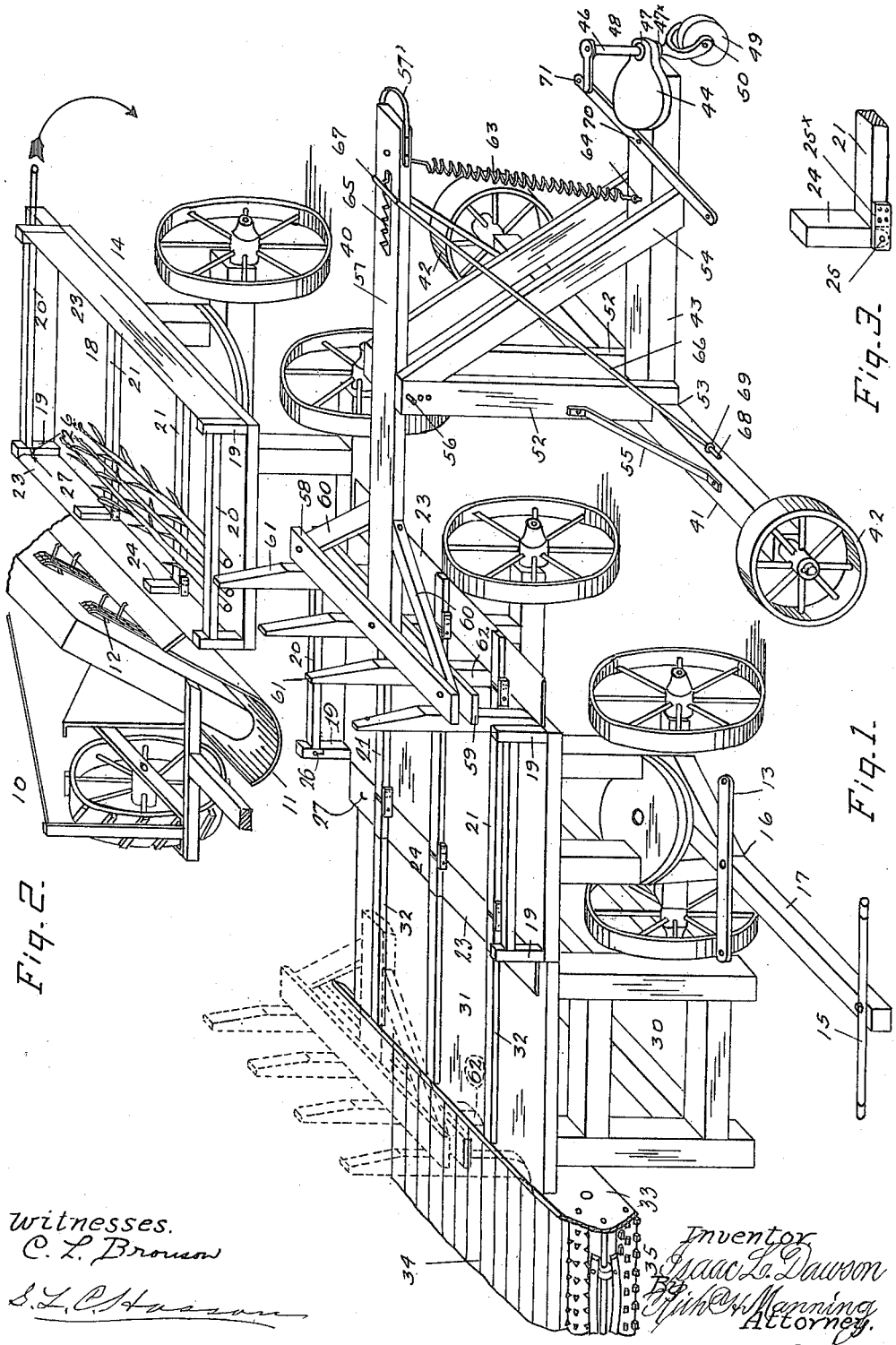
Witnesses.
C. L. Bronson
S. L. C. Hanson
Inventor
Isaac L. Dawson
By H. Manning
Attorney.

UNITED STATES PATENT OFFICE.

ISAAC L. DAWSON, OF MAPLEHILL, KANSAS.

SYSTEM AND APPARATUS FOR DISPOSING OF PLANT-STALKS.

1,162,985.

Specification of Letters Patent.

Patented Dec. 7, 1915.

Application filed September 28, 1914. Serial No. 863,970.

*To all whom it may concern:*

Be it known that I, ISAAC L. DAWSON, a citizen of the United States of America, residing at Maplehill, in the county of Wabaunsee and State of Kansas, have invented certain new and useful Improvements in the System and Apparatus for Disposing of Plant-Stalks; and I do hereby declare that the following is a full, clear, and exact description of the invention, such as will enable others to make and use the same, reference being had to the accompanying drawing, forming a part of this specification.

The primary object of the invention is to gather the stalks, such as corn-stalks, as they are handled in the field, and deliver the stalks to the ensilage cutter, without the necessity of bunching and binding the harvested stalks; second, to dispense with the binding of corn or other plants, after being cut by the harvester; and third, to save the time and labor usually expended in conveying the harvested corn-stalks from the harvester in the field to the place of utilization, for animal food.

The invention consists in the novel construction and arrangement of parts, such as will be first fully described and then specifically pointed out in the claims.

In the drawings: Figure 1. is an isometric view of the invention, showing in dotted lines the position of the stalk-dumping teeth, when the empty stalk-conveying wagon has been removed and the dumping apparatus has taken its place and completed its operative dumping movement. Fig. 2. is a view of the harvester in the field, showing the manner of loading the stalks in the wagon accompanying the harvester. Fig. 3. is a detail view of the drop side joint on the wagon.

Similar numerals of reference indicate like parts in all the figures of the drawing.

The stalks of corn when harvested in the field are usually gathered into bundles, and the stalks bound together in the bundles by means of binding twine, passed around the stalks, and the ends of the twine fastened together. This operation of tying the stalks in bundles is commonly performed upon the harvesting machine, making it necessary to handle the bundles of corn twice before the stalks are utilized for ensilage purposes, and requiring not only large quantities of twine, but the services of an extra person to cut the bands before the stalks are presented to the stalk cutting machine. For the purpose of saving this unnecessary expense in time, labor and material, the harvesting of the corn under the improved system is performed by a well-known stalk cutting and elevating machine, as shown at 10, in the accompanying drawings, in which the stalks are cut by the machine, and fall with the butts to the rear within the trough 11, and are taken therefrom by elevator 12, and delivered to the wagon 14, which as seen is in position alongside the elevator, both harvesting machine and the wagon being advanced in the field in a parallel position, and by the driving power employed the slow method being a team harnessed to a whiffletree 13, at the rear end of the pole 17 to move the wagon in the direction of movement required. The movable stalk-conveying vehicle or wagon 14 is of ordinary construction, having flat bottom boards 18, and fixed corner posts 19, at each of the four corners of the wagon. Transverse connecting bars 20 are connected at the ends with the respective corner posts 19. Upon the upper surface of the bottom boards 18 are fixed the transverse bars 21, these bars being spaced apart equal distances from each other and extending from one longitudinal side portion of the bottom boards 18 to the line of the other side, and being flush at said ends, as seen in detail in Fig. 3.

The sides of the wagon, are for dumping the corn, and hence movable outwardly and downwardly. The sides as seen consist of longitudinal plates 23, and upon the inner surface are secured firmly the vertical bars 24, the inner ends of which are curved and abut the outer ends of the bars 21, on the bottom boards 18, of the wagon, said inner ends of the bars 24 being hinged at 25, to the outer ends of the plates 25ˣ, secured to the ends of bars 21, so as to move outwardly and downwardly.

The side members of the body of the wagon are held in a vertical position by the hooks 26, on the posts, which engage with the staples 27, on the inner surfaces of the side plates 23.

30 indicates a table frame, supporting a platform 31, as shown rectangular in form. Upon the upper surface of the table are secured the transverse bars 32, spaced apart the same distance as the bars 21, on the bottom board 18, of the wagon, and extending from the line of one longitudinal outer surface of the platform about three-fourths the distance toward the other, inner longitudinal surface, so as to leave a space between the ends of the bars 31 and said outer, longitudinal surface, for the drop of the sides 22, of the wagon thereon, as further described.

33 indicates the longitudinal box frame, or conduit, supporting the endless conveyer, the upper portion of one side of which frame is secured to the longitudinal outer surface of the platform 31.

34 indicates the endless conveyer, and 35 indicates the ensilage cutter devices, of well known construction, and therefore, not requiring further description.

40 indicates the stalk dumping apparatus, which consists of an axle beam 41, upon the ends of which are journaled the wheels 42, which as shown are small in circumference. With the central portion of the beam 41 is connected the forward end of a steering beam 43, the rear end of which extends rearwardly a considerable distance, and upon the upper surface of said end is a plate 44, supporting the operator. The rear portion of the plate 44 extends a short distance past the rear end of beam 43. Extending upwardly through said plate 44 is a rotary shaft 46, having bearing rings 47—47ˣ, supporting said shaft in position. The lower end of shaft 46 is forked and provided with the roller 49, journaled at 50 in said forked ends.

52 indicates vertical standards, the lower ends being notched at 53, and secured rigidly at their lower ends to the upper and rear surfaces of the bar 43, the upper ends of the standards extending upwardly in a parallel position, to a height approximately above that of an ordinary wagon bed. These standards 52 are provided with braces 54, which extend from the rear surfaces and upper ends of the standards 52 downwardly and rearwardly, and are secured to the outer, vertical surfaces of the beam 43, at a point about midway from the beam 41 to the rear end of said beam 43. Brace rods 55 extend from the lateral surfaces of the upright standards 52 downwardly, and are secured to the upper surfaces of the beam 41.

Between the upper ends and inner surfaces of the standards 52 is pivoted, by the transverse pivot or bolt 56, adjustably, a longitudinal beam 57, one end of which beam extends rearwardly to a position slightly forward of a vertical line passing through the forward end of the plate 44, on the beam 43. The other end of the beam 57 extends forwardly, to a position in advance of the beam 52, sufficient to be projected across an ordinary wagon bed, and upon the upper and lower surfaces of said end of the beam are secured the transverse bars 58 and 59, the length of which bars is slightly less than the length of an ordinary wagon bed. These bars 58 are braced by the brace bars 60, which extend from a position between and at the outer ends of the bars 58 and 59, rearwardly, and are secured to the outer surfaces of the beam 57. At the rear end of beam 57 is an operating handle 57ˣ.

To the outer surfaces of the bars 58 and 59 are secured rigidly the vertically-disposed stalk-dumping teeth or blocks 61, spaced at equal distances apart, the outer teeth being adjacent the ends of the bars 58 and 59. The ends of teeth 61 extend the requisite distance above and below the respective bars 58 and 59, to engage with a full load of stalks on the wagon bed, the rear surfaces of the lower ends of said teeth 61 being rearwardly and upwardly curved at 62. With the lower surface and rear end of said beam is connected one end of a spiral spring 63, the other end of said spring being connected at a point directly below said rear end with a staple 64, on the upper surface of the beam 43.

Upon the upper surface and rear end portion of beam 57 is secured a rack 65.

66 indicates a securing rod, to prevent lateral strain on the beam 57, a portion 67, of which rod, extends transversely to the beam 57, and engages with the rack 65, the ends of said rod extending forwardly and downwardly, and having portions bent at right angles and inserted within the staples or eyes 69, on the rear surface of the beam 41.

Upon the beam 43 is pivoted, at 70, a whiffletree 71, to which whiffletree the horses are hitched, when horses are employed to move the apparatus.

In operation the dumping apparatus is placed in position a considerable distance from the table 30, with the beams 58 and 59 supporting the teeth 60, extending in the same direction as said table. The wagon 14, with its load of stalks, is now moved into the dotted position seen in Fig. 1, parallel with the longitudinal inner surface of the platform 31, and the sides 23 released, by removing the hook 26, the side in the direction of the platform 31 falling thereon, so as to bring the bars 32 and bars 24 in line with each other. The other side member of the wagon is let down, and falls into the dotted position seen in Fig. 1. The teeth of the dumping apparatus 40 are now moved into a position to meet the stalks, which as seen upon the wagon have their butts forward in position. Power now being applied to the dumping apparatus, the teeth 60 move over the upper surface of the bottom boards 18, forcing the stalks from the bars 21, upon which the plates are supported, and moving the entire load of stalks upon the bars 32, upon the platform 31. Power is again applied to the dumping apparatus, and the teeth 61 drawn backwardly over the side 22, past the bottom 18 and into the original position seen in full lines in Fig. 1. The wagon 14 is then withdrawn from its position alongside of the platform 31, its sides fastened in position, and the wagon moved to the position beside the harvesting machine, as seen in Fig. 2. Upon the withdrawal of the wagon 14 from the position upon the side of the platform, power is again applied to the dumping apparatus, and the apparatus moved in the position previously occupied by the wagon, the teeth 60 now being applied directly to the stalks on the bars 32, on the platform 31, and the stalks moved gradually, toward the moving slats of the conveyer 34, so that the stalks will fall in quantities sufficient to be carried to the cutters 35, and cut into short lengths for ensilage. As soon as all the stalks on the table or platform 31 are fed to the conveyer 34, the dumping apparatus 40 is moved backward into the position seen in full lines in Fig. 1, and the operation of supplying and dumping the stalks, as heretofore described repeated.

In the movements forward of the dumping machine, the beam 57 is under full control of the operator standing upon the platform 44, and in grasping the handle 60, an adjustment of the teeth 61 is readily afforded, so as to permit the teeth to engage with the stalks and remove them partially, in repeated forward and backward movements of the dumping apparatus, the spring 53 preventing the shock which would otherwise occur when the teeth 61 fall upon the wagon bed. The normal position of the beam 57 is controlled by the adjusting rod 66, which may be adjusted in the rack 65, to permit the position of the beam 57 to be changed, and hence the teeth 61 to the requirements of a disparity in heights of wagons, which vary, and consequently the height of the wagon bed.

The invention enables the disposition to be made of the stalks, from the standing corn stalks to the final use of the stalk as food, without bunching or tying, and thus dispensing with the cost of the time and materials required for those operations.

I am aware that reciprocating rakes have been employed to draw the stalks from the platform of a wagon to the conveyer.

In my invention and in the employment of the alined stalk supporting bars on the wagon and platform there is less frictional surface than hitherto, hence the large bodies of corn stalks are moved with the application of less power from one to the other and to the conveyer.

Having fully described my invention, what I now claim as new and desire to secure by Letters Patent is:

1. A stalk-dumping apparatus comprising a movable frame, standards supported by said frame, a beam pivotally connected with said standards intermediate the ends of said beam, stalk-dumping devices carried by one end of said beam, and an adjusting rod pivotally connected at its ends with said frame, and a rack on said beam with which the intermediate portion of said rod is adapted to engage.

2. A stalk-dumping machine composed of a main axle beam, and wheels thereon, a rear guide beam connected with the axle beam, and a swivel wheel supporting the latter beam, standards supported by the axle beam, and a horizontal beam pivotally connected intermediate its ends with the upper ends of said standards, transverse bars connected with one end of said beam, and teeth connected with said bars, and operating handle at the other end of said beam, and an expanding and contracting spring controlling the upward and downward movement of said end of the beam, and an adjusting rod pivotally connected at its ends with said axle beams, and a rack on said end of the beam with which the intermediate portion of said rod is adapted to engage.

ISAAC L. DAWSON.

Witnesses:
    SALLIE A. CREASON,
    JOHN S. BATES.

Copies of this patent may be obtained for five cents each, by addressing the "Commissioner of Patents, Washington, D. C."